(12) United States Patent
Taniguchi

(10) Patent No.: US 10,873,223 B2
(45) Date of Patent: Dec. 22, 2020

(54) ELECTRONIC APPARATUS AND METHOD

(71) Applicant: KABUSHIKI KAISHA TOSHIBA, Tokyo (JP)

(72) Inventor: Kentaro Taniguchi, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 13 days.

(21) Appl. No.: 16/294,013

(22) Filed: Mar. 6, 2019

(65) Prior Publication Data

US 2020/0044492 A1 Feb. 6, 2020

(30) Foreign Application Priority Data

Aug. 3, 2018 (JP) .................. 2018-146876

(51) Int. Cl.
*H02J 50/23* (2016.01)
*H02J 50/40* (2016.01)
*H02J 50/80* (2016.01)
*H02J 50/90* (2016.01)
*H01Q 21/29* (2006.01)
*G06F 1/16* (2006.01)

(52) U.S. Cl.
CPC ............ *H02J 50/80* (2016.02); *G06F 1/1683* (2013.01); *H01Q 21/29* (2013.01); *H02J 50/23* (2016.02); *H02J 50/40* (2016.02); *H02J 50/90* (2016.02)

(58) Field of Classification Search
CPC ........ G06F 1/1683; H01Q 21/29; H02J 50/20; H02J 50/23; H02J 50/40; H02J 50/80; H02J 50/90
See application file for complete search history.

(56) References Cited

U.S. PATENT DOCUMENTS

| | | | | |
|---|---|---|---|---|
| 6,188,913 B1* | 2/2001 | Fukagawa | ............ | H01Q 3/2605 455/562.1 |
| 2010/0264746 A1* | 10/2010 | Kazama | ................ | H04W 52/18 307/104 |
| 2012/0194125 A1* | 8/2012 | Kanasugi | ................ | H02J 50/10 320/108 |
| 2012/0309308 A1* | 12/2012 | Kim | ........................ | H02J 50/80 455/41.1 |
| 2013/0062959 A1 | 3/2013 | Lee et al. | | |
| 2013/0062963 A1* | 3/2013 | Chernokalov | .......... | H02J 7/025 307/104 |
| 2014/0232201 A1* | 8/2014 | Staring | ................... | H01F 38/14 307/104 |
| 2019/0245388 A1* | 8/2019 | Murata | .................... | H02J 50/40 |
| 2020/0028384 A1* | 1/2020 | Murata | ................. | H02J 50/402 |

FOREIGN PATENT DOCUMENTS

JP 2014533481 A 12/2014

* cited by examiner

*Primary Examiner* — Levi Gannon
(74) *Attorney, Agent, or Firm* — Holtz, Holtz & Volek PC

(57) ABSTRACT

According to one embodiment, an electronic apparatus includes a power transmitter, a receiver and control circuitry. The power transmitter is configured to transmit power to a first electronic apparatus by an electromagnetic waves. The receiver is configured to receive a communication signal wirelessly from a second electronic apparatus. The control circuitry is configured to control power transmitted by the power transmitter, based on at least detection sensitivity of the receiver.

16 Claims, 7 Drawing Sheets

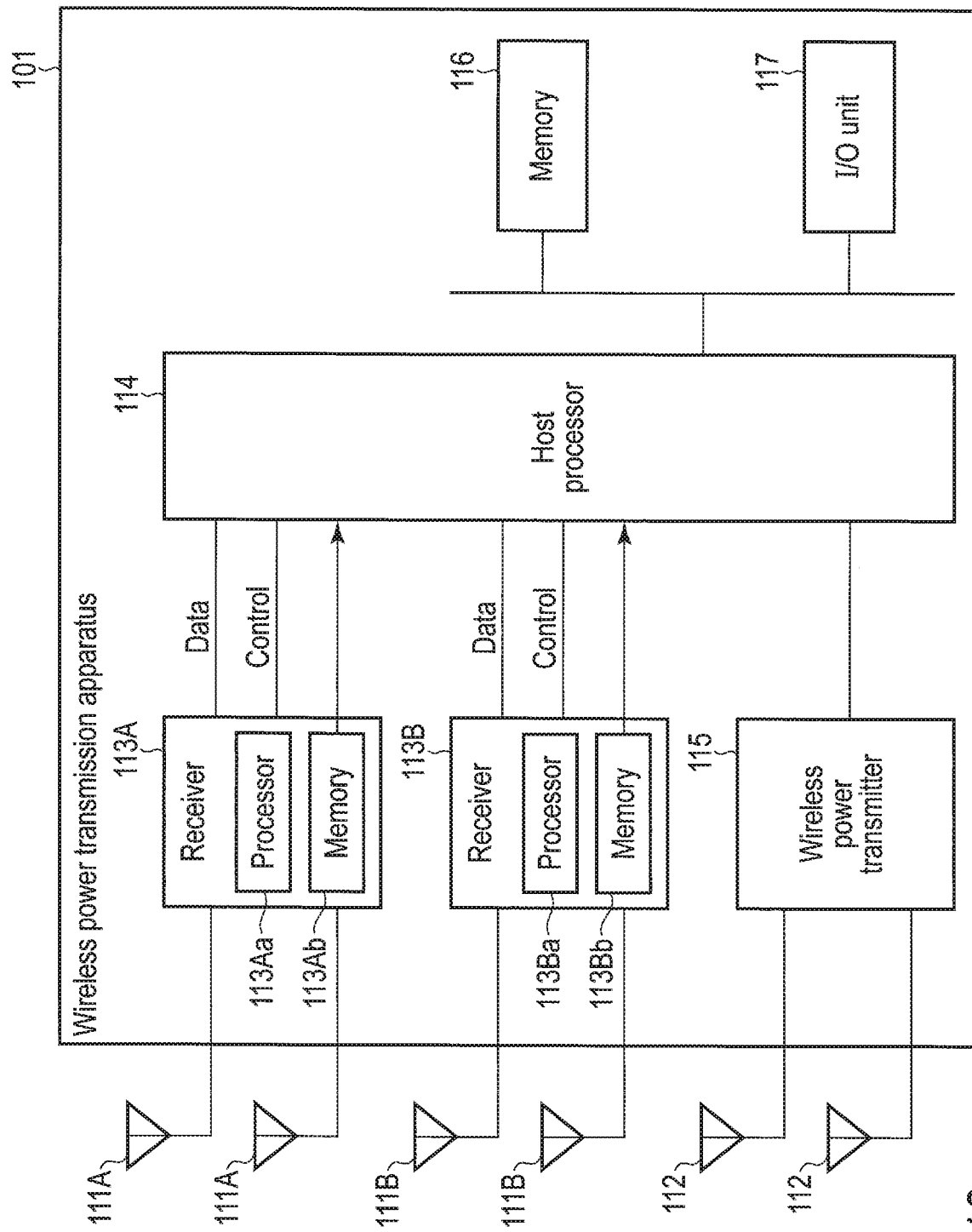
F I G. 10

ELECTRONIC APPARATUS AND METHOD

CROSS-REFERENCE TO RELATED APPLICATIONS

This application is based upon and claims the benefit of priority from Japanese Patent Application No. 2018-146876, filed Aug. 3, 2018, the entire contents of which are incorporated herein by reference.

FIELD

Embodiments described herein relate generally to an electronic apparatus and a method.

BACKGROUND

In wireless power transmission to transmit power using electromagnetic waves (referred to as "wireless power transmission" hereinafter), generally, the electromagnetic waves have a specific frequency and thus the power transmission is likely to interfere with a wireless communication system using a frequency close to the specific frequency.

It is therefore desired to develop a technology capable of wireless power transmission without causing serious interference with the wireless communication system.

BRIEF DESCRIPTION OF THE DRAWINGS

FIG. 10 shows an example of a hardware configuration of a wireless power transmission apparatus according to the fourth embodiment.

DETAILED DESCRIPTION

Figure 1:
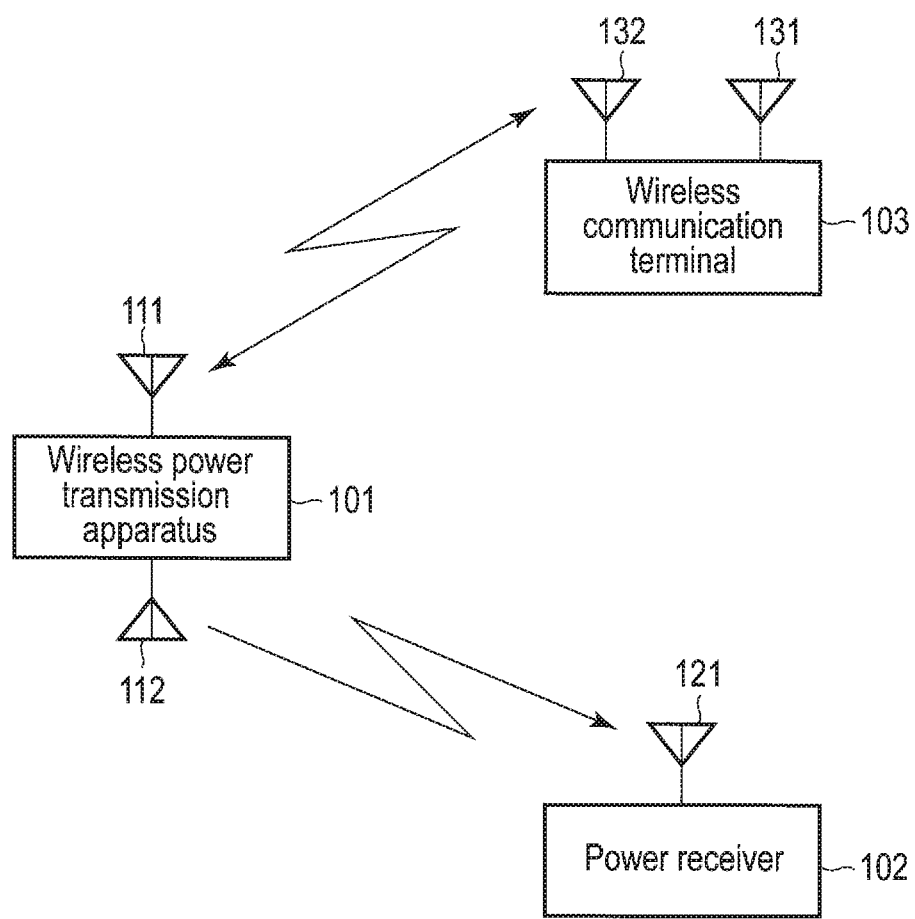
FIG. 1 shows an example of wireless power transmission environment according to a first embodiment.

In general, according to one embodiment, an electronic apparatus includes a power transmitter, a receiver and control circuitry. The power transmitter is configured to transmit power to a first electronic apparatus by an electromagnetic waves. The receiver is configured to receive a communication signal wirelessly from a second electronic apparatus. The control circuitry is configured to control power transmitted by the power transmitter, based on at least detection sensitivity of the receiver.

Embodiments will be described below with reference to the accompanying drawings. The disclosure of the embodiments is nothing but one example, and the invention is not limited by the descriptions of the embodiments. Modifications that could easily be conceived by a person with ordinary skill in the art are included in the scope of the disclosure. To make the descriptions clearer, the drawings may show, for example, the size and shape of each element more schematically than those in the actual aspect.

Elements corresponding to each other in the drawings are denoted by the same reference numeral and their detailed descriptions may be omitted.

First Embodiment

FIG. 1 shows an example of wireless power transmission environment according to a first embodiment. The wireless power transmission environment includes a wireless power transmission system that is configured by a wireless power transmission apparatus 101 (an electronic apparatus) and a power receiver 102 (a first electronic apparatus), and a wireless communication terminal 103 (a second electronic apparatus). Assume that the wireless communication terminal 103 carries out communications with a different wireless communication terminal (not shown) using a predetermined frequency.

The wireless power transmission apparatus 101 can supply power to the power receiver 102 wirelessly (i.e., the wireless power transmission apparatus 101 can execute the wireless power transmission to the power receiver 102) without causing serious interference with a wireless communication system that is configured chiefly by the wireless communication terminal 103 and the different wireless communication terminal. Below is a description of the wireless power transmission apparatus 101.

The wireless power transmission apparatus 101 includes a receiving antenna 111 and a transmitting (power transmitting) antenna 112. The receiving antenna 111 is an antenna configured to receive (acquire) a wireless signal from the wireless communication terminal 103 in the wireless communication system described above. The transmitting antenna 112 is an antenna configured to execute the wireless power transmission with predetermined transmission power (power of electromagnetic waves) to the power receiver 102 wirelessly. Assume that the "transmission power" (and "reception power") in the first embodiment represents antenna power not including an antenna gain to be described later.

Figure 2:
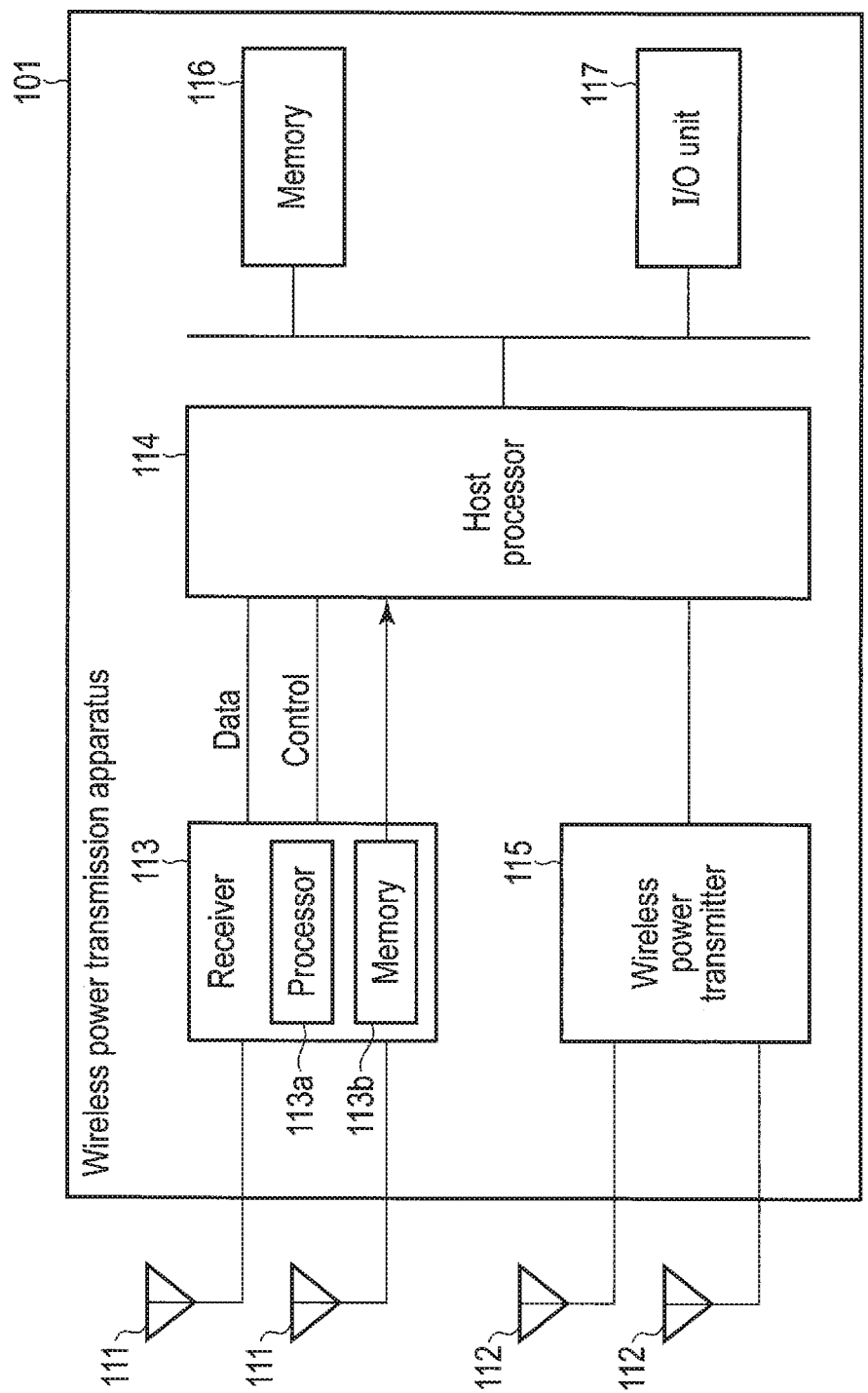
FIG. 2 shows an example of a hardware configuration of a wireless power transmission apparatus according to the first embodiment.

The wireless power transmission apparatus 101 will be described in more detail with reference to FIG. 2. FIG. 2 shows an example of a hardware configuration of the wireless power transmission apparatus 101.

As shown in FIG. 2, the wireless power transmission apparatus 101 includes at least one receiving antenna 111, at least one transmitting antenna 112, a receiver 113, a host processor 114 (control circuitry), a wireless power transmitter (WPT) 115, a memory 116, an I/O unit 117 and the like.

As described above, the receiving antenna 111 is an antenna to receive a wireless signal (communication signal) which is transmitted from the wireless communication terminal 103 to another wireless communication terminal (the different wireless communication terminal) in the wireless communication system. As described above, the transmitting antenna 112 is an antenna to transmit (supply) power with predetermined transmission power $P_1$ to the power receiver 102 wirelessly. The receiving antenna 111 and transmitting antenna 112 have a receiving antenna gain and a transmitting antenna gain, respectively as antenna characteristics. The gain of an antenna may include whatever information if it can specify the ratio of the intensity of a wireless signal arrived at one end of the antenna to the intensity of a wireless signal at the other end of the antenna and also include a beam forming gain, a diversity gain and the like. Note that the intensity of a wireless signal can be referred to as the magnitude of a wireless signal.

In the first embodiment, the receiving antenna gain of the receiving antenna 111 is assumed to be $G_{r1}$ and the transmitting antenna gain of the transmitting antenna 112 is assumed to be $G_{t1}$. In other words, the intensity of a wireless signal transmitted from the wireless communication terminal 103 (or the power supplied by the receiving antenna 111) is amplified by the receiving antenna gain $G_{r1}$, and the amplified signal is output to the receiver 113. The intensity of a wireless signal output from the wireless power transmitter 115 (or the power $P_1$ supplied to the transmitting antenna 112) is amplified by the transmitting antenna gain $G_{t1}$, and the amplified signal is radiated (transmitted) to the power receiving terminal 102.

The receiver 113 receives a wireless signal from the wireless communication terminal 103 via the receiving antenna 111. More specifically, the receiver 113 receives (detects) a wireless signal from the wireless communication terminal 103 based on signal detection sensitivity α. The signal detection sensitivity α may include whatever information if the information is capable of identifying the lower limit of the intensity of a detectable wireless signal. For example, it may be stored in a memory 113b in the receiver 113, or may be fixed and set during the manufacture of the wireless power transmission apparatus 101, or may be dynamically changed by a processor 113a in the receiver 113 in accordance with user settings, communication environment, or the operation mode of the receiver 113 (a way to use the receiving antenna 111, a receiving antenna gain (e.g., a beam forming gain and a diversity gain), etc.).

The host processor 114 controls the wireless power transmitter 115 to compute the upper limit value of transmission power $P_1$ that can execute the wireless power transmission to the power receiver 102, without causing serious interference with the wireless communication system, execute the wireless power transmission with the transmission power $P_1$ whose level is not higher than the computed upper limit value, and supply power to the power receiving terminal 102. The method of computing the upper limit value of the transmission power $P_1$ will be described in detail later.

The host processor 114 is connected to the memory 116 and I/O unit 117 via a bus. The host processor 114 may achieve various functions as described above by executing a program (i.e., software) that is downloaded from an external apparatus by the I/O unit 117 and stored in the memory 116, achieve the functions by hardware, and achieve the functions by the combination of software and hardware.

The wireless power transmitter 115 executes the wireless power transmission with the predetermined transmission power $P_1$ to the power receiver 102 via the transmitting antenna 112. More specifically, in response to an instruction from the host processor 114, the wireless power transmitter 115 executes the wireless power transmission with the predetermined transmission power $P_1$ to the power receiver 102.

In the first embodiment, the receiver 113 and the wireless power transmitter 115 are provided as different chips; however, for example, they can be achieved by a single chip. Furthermore, the receiving antenna 111 and the transmitting antenna 112 are each provided; however, for example, a single antenna having a transmitting/receiving function can be provided. Moreover, the receiving antenna 111 and the receiver 113 are provided separately; however, for example, they can be provided integrally as one component. Similarly, the transmitting antenna 112 and the wireless power transmitter 115 are provided separately; however, for example, they can be provided integrally as one component. Furthermore, the receiver 113 and the wireless power transmitter 115 are included in one wireless power transmission apparatus 101; however, an apparatus (receiver) including the receiver 113 and an apparatus (transmitter) including the wireless power transmitter 115 can be provided separately in consideration of an appropriate relationship in position (distance) between them.

Returning again to FIG. 1, the power receiver 102 includes a receiving antenna 121 to receive power from the wireless power transmission apparatus 101 via the receiving antenna 121.

The wireless communication terminal 103 includes a receiving antenna 131 and a transmitting antenna 132. The receiving antenna 131 receives a wireless signal from another wireless communication terminal included in the wireless communication system. The transmitting antenna 132 transmits a wireless signal to another wireless communication terminal included in the foregoing wireless communication system.

Like the receiving antenna 111 and transmitting antenna 112 of the wireless power transmission apparatus 101, the receiving antenna 131 and transmitting antenna 132 of the wireless communication terminal 103 have a receiving antenna gain and a transmitting antenna gain, respectively as antenna characteristics. Note that the communication method of the wireless communication system including the wireless communication terminal 103 is generally standardized because wireless communications are performed utilizing a frequency of a finite asset. Also, an authentication test to test a apparatus conforming to the communication method is generally standardized. That is, the transmission power and antenna gain of the wireless communication terminal 103, the acceptable level for interference waves (referred to as "interference acceptable level" hereinafter) and the like are generally defined in the written standards and authentication test specifications of the communication method, and are known values.

Assume in the first embodiment that the transmission power of the wireless communication terminal 103 is $P_2$, the receiving antenna gain is $G_{r2}$, the transmitting antenna gain is $G_{t2}$ and the interference acceptable level is $P_3$. Note that the interference acceptable level may include whatever level if it has the upper limit of the intensity of interference waves (interference signals, wireless signals) capable of ensuring the establishment of wireless communication with another wireless communication terminal as described above even though there are interference waves (or wireless signals transmitted from an interfering wireless apparatus).

Figure 3:
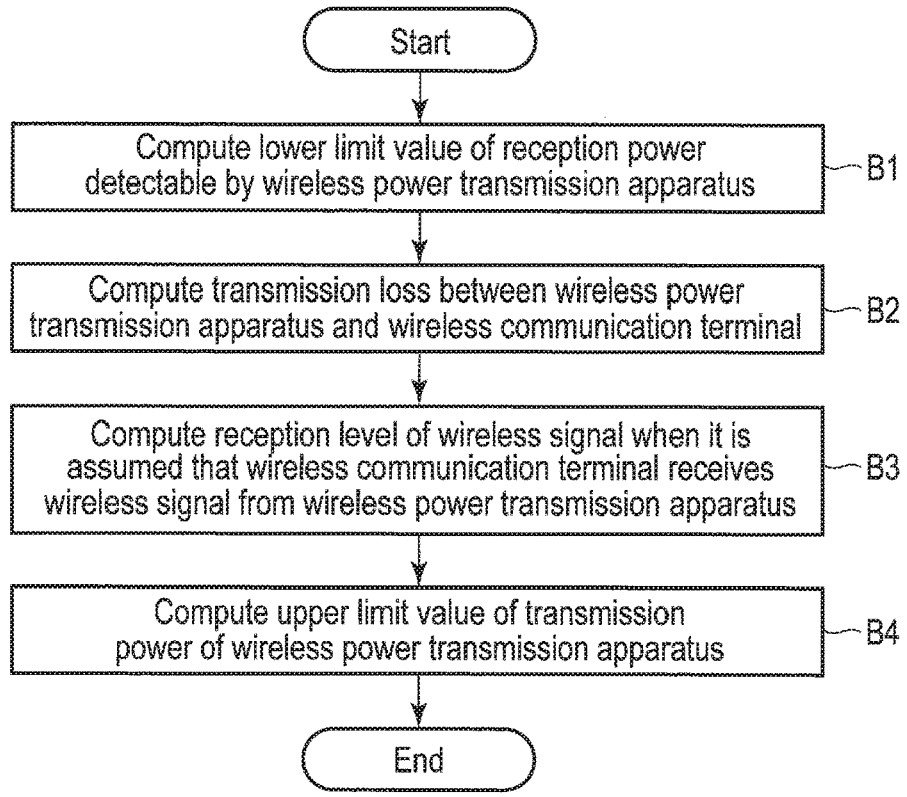
FIG. 3 is a flowchart showing an example of a procedure for computing an upper limit value of transmission power of the wireless power transmission apparatus according to the first embodiment.

A method (procedure) for computing the upper limit value of the transmission power $P_1$ by the host processor 114 will be described in detail with reference to the flowchart of FIG. 3. Assume here that the transmission power of the wireless transmission feeding apparatus 101 is $P_1$, the receiving antenna gain is $G_{r1}$, the transmitting antenna gain is $G_{t1}$, and the signal detection sensitivity is α as described above. Furthermore, assume that the transmission power of the wireless communication terminal 103 is $P_2$, the receiving antenna gain is $G_{r2}$, the transmitting antenna gain is $G_{t2}$, and the interference acceptable level is $P_3$.

First, the host processor 114 computes the lower limit $P_4$ (referred to as "limit reception level" hereinafter) of reception power that can be detected by the wireless power transmission apparatus 101. Specifically, the host processor 114 computes the limit reception level $P_4$ based on the receiving antenna gain $G_{r1}$ and the detection sensitivity $\alpha$ (block B1), as represented by the following equation (1).

$$P_4 = \alpha - G_{r1} \quad (1)$$

The following is a supplementary description of the above equation (1). The signal detection sensitivity $\alpha$ represents the lower limit of the intensity of a wireless signal that can be detected by the receiver 113, as described above. Since the wireless signal received via the receiving antenna 111 is amplified by the receiving antenna gain $G_{r1}$ and output to the receiver 113, the limit reception level $P_4$ indicating the lower limit of the reception power that can be detected by the wireless power transmission apparatus 101 is computed based on the above equation (1).

Then, the host processor 114 computes a transmission loss $L_2$ between the wireless power transmission apparatus 101 and the wireless communication terminal 103 when it is assumed that a wireless signal from the wireless communication terminal 103 is detected at the limit reception level $P_4$. Specifically, as represented by the following equation (2), the host processor 114 computes a transmission loss $L_2$ based upon the limit reception level $P_4$ of the wireless power transmission apparatus 101, and the transmission power $P_2$ and transmitting antenna gain $G_{t2}$ of the wireless communication terminal 103 (block B2).

$$L_2 = P_2 + G_{t2} - P_4 \quad (2)$$

The following is a supplementary description of the above equation (2). The transmission power $P_2$ of the wireless communication terminal 103 is amplified by the transmitting antenna gain $G_{t2}$ by the transmitting antenna 132, and the amplified power is radiated. Since, however, the intensity of the wireless signal (reception power) detected by the wireless power transmission apparatus 101 is the limit reception level $P_4$, the transmission loss $L_2$ between the wireless power transmission apparatus 101 and the wireless communication terminal 103 is computed based on the equation (2). In the equation (2), the sum of the transmission power $P_2$ and the transmitting antenna gain $G_{t2}$ of the wireless communication terminal 103 is referred to as radiation power of electromagnetic waves radiated from the wireless communication terminal 103.

Then, the host processor 114 computes a wireless signal reception level $P_5$ when it is assumed that the wireless communication terminal 103 receives a wireless signal from the wireless power transmission apparatus 101. Specifically, as represented by the following equation (3), the host processor 114 computes a wireless signal reception level $P_5$ based upon the transmission power $P_1$ and transmitting antenna gain $G_{t1}$ of the wireless power transmission apparatus 101, the receiving antenna gain $G_{r2}$ of the wireless communication terminal 103 and the transmission loss $L_2$ between the wireless power transmission apparatus 101 and the wireless communication terminal 103 (block B3).

$$P_5 = P_1 + G_{t1} - L_2 + G_{r2} \quad (3)$$

The following is a supplementary description of the above equation (3). The transmission power $P_1$ of the wireless power transmission apparatus 101 is amplified by the transmitting antenna gain $G_{t1}$ by the transmitting antenna 112, and the amplified power is radiated to the wireless communication terminal 103, whereas it is attenuated by the transmission loss $L_2$ before it reaches the wireless communication terminal 103. Since, however, the wireless communication terminal 103 receives a wireless signal from the wireless power transmission apparatus 101 by amplifying the signal by the receiving antenna gain $G_{r2}$ of the receiving antenna 131, the wireless signal reception level $P_5$ is computed based on the equation (3). In the equation (3), the sum of the transmission power $P_1$ and the transmitting antenna gain $G_{t1}$ of the wireless power transmission apparatus 101 is referred to as radiation power of electromagnetic waves radiated from the wireless power transmission apparatus 101.

After that, the host processor 114 computes the upper limit value of the transmission power $P_1$ of the wireless power transmission apparatus 101.

Specifically, the host processor 114 computes the upper limit value of the transmission power $P_1$ such that the wireless signal reception level $P_5$ becomes not higher than the interference acceptable level $P_3$, as represented by the following expression (4) (block B4).

$$P_5 \leq P_3 \quad (4)$$

The following is a supplementary description of the above expression (4). Even though the wireless communication terminal 103 receives a wireless signal from the wireless power transmission apparatus 101, if the wireless signal reception level $P_5$ is not higher than the interference acceptable level $P_3$ which is the upper limit of the intensity of an interference signal capable of ensuring the establishment of wireless communication between the wireless communication terminal 103 and another wireless communication terminal as described above, the wireless communication system will not be broken. Thus, the upper limit of the transmission power $P_1$ of the wireless power transmission apparatus 101 is computed based on the above expression (4).

The above expression (4) can be modified as represented by the following expression (5) on the basis of the above equation (3).

$$P_1 + G_{t1} - L_2 + G_{r2} \leq P_3 \quad (5)$$

Further, the above expression (5) can be modified in sequence to the following expressions (6) to (8) based upon the above equations (1) to (3).

$$P_1 \leq P_3 - G_{t1} + L_2 - G_{r2} \quad (6)$$

$$P_1 \leq P_3 - G_{t1} + P_2 + G_{t2} - \alpha + G_{r1} - G_{r2} \quad (7)$$

$$P_1 \leq (-\alpha + G_{r1} - G_{t1}) + (P_2 + G_{t2} - G_{r2} + P_3) \quad (8)$$

As described above, when the host processor 114 computes the upper limit value of the transmission power $P_1$ that can execute the wireless power transmission to the power receiver 102, without causing serious interference with the wireless communication system, it controls the wireless power transmitter 115 to execute the wireless power transmission with the transmission power $P_1$ whose level is not higher than the computed upper limit value, to the power receiver 102.

The following is a supplementary description of the above expression (8). The first parenthesized portion $(-\alpha + G_{r1} - G_{t1})$ of the right side of the expression (8) (referred to as "first term" hereinafter) is a term including signal detection sensitivity $\alpha$ of the wireless power feeding apparatus 101 and antenna gains $G_{r1}$ and $G_{t1}$, and each value is known to the wireless power transmission apparatus 101. According to the first term, the capability of the wireless power transmission apparatus 101 to detect the wireless communication system (wireless communication terminal 103) is defined.

The second parenthesized portion $(P_2+G_{t2}-G_{r2}+P_3)$ of the right side of the expression (8) (referred to as "second term" hereinafter) is a term including transmission power $P_2$ of the wireless communication terminal 103, antenna gains $G_{t2}$ and $G_{r2}$, and interference acceptable level $P_3$, and each value is a known value that is generally defined by, e.g., the communication standard, authentication standard and business standard of the wireless communications as described above. Note that even though the value is not strictly defined, it can easily be grasped because there are recommended values and specification values if the wireless communication terminal 103 is on the market.

It can be seen from the above expression (8) that as the signal detection sensitivity α of the wireless power transmission apparatus 101 is low or the receiving antenna gain $G_{r1}$ is small, the capability of detecting a wireless communication system becomes lower and the transmission power $P_1$ becomes smaller. It can also be seen that as the signal detection sensitivity α of the wireless power transmission apparatus 101 is high or the receiving antenna gain $G_{r1}$ is large, the capability of detecting a wireless communication system becomes higher and the transmission power $P_1$ becomes larger. That is, the wireless power transmission apparatus 101 can compute the upper limit value of the transmission power $P_1$ in accordance with the detection capability of the wireless power transmission apparatus 101 itself, regardless of whether or not the wireless communication system (wireless communication terminal 103) is detected or not.

According to the first embodiment described above, the wireless power transmission apparatus 101 includes the host processor 114 capable of controlling the wireless power transmitter 115 to compute the upper limit value of the transmission power $P_1$ that can execute the wireless power transmission to the power receiver 102 without causing serious interference with the wireless communication system (wireless communication terminal 103) on the basis of the above expression (8) and execute the wireless power transmission with the transmission power $P_1$ whose level is not higher than the computed upper limit value to the power receiver 102. This makes it possible to execute the wireless power transmission with a large amount of power to the power receiver 102 without causing serious interference with the wireless communication system. That is, suitable transmission power $P_1$ can be set for both the power receiver 102 and the wireless communication terminal 103.

The first embodiment has been described with the assumption of wireless power transmission environment including a single wireless power transmission apparatus 101 and a single wireless communication terminal 103, but it is not limited to this wireless power transmission environment. For example, even if the wireless power transmission environment includes a plurality of wireless power transmission apparatuses 101, the same advantage as described above can be obtained. For example, it is assumed that the wireless power transmission environment includes two wireless power transmission apparatuses 101a and 101b and these wireless power transmission apparatuses 101a and 101b have different antenna gains as shown in FIG. 4.

Figure 4:
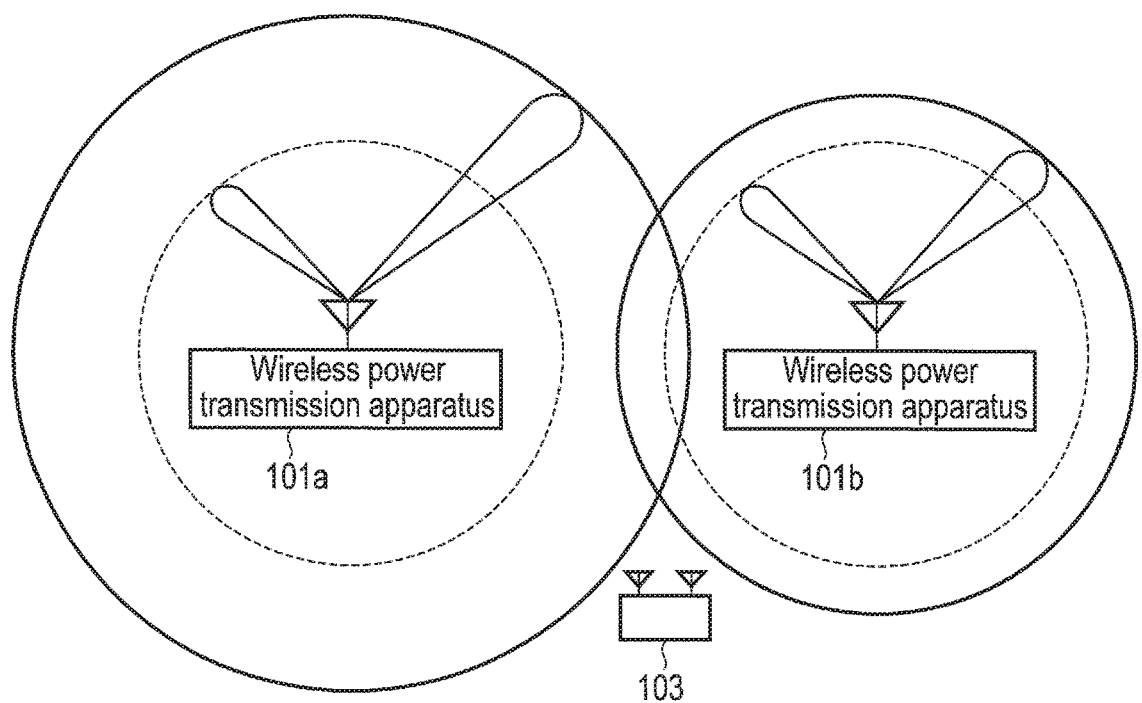
FIG. 4 shows an example of wireless power transmission environment other than that shown in FIG. 1.

If, in this case, the upper limit values of transmission power of the two wireless power transmission apparatuses 101a and 101b are set by a general method, they are often set to the same value, with the result that interference will be excessively considered, and the transmission power will become low and the range in which power can be supplied will become narrow, as indicated by the dotted line in FIG. 4. On the other hand, when the upper limit values of transmission power of the wireless power transmission apparatuses 101a and 101b are set individually according to the above expression (8), the upper limit value of transmission power can be set in accordance with the detection capability of each of the wireless power transmission apparatuses 101a and 101b. It is thus possible to increase the transmission power and broaden the range in which the power can be supplied while avoiding interference with the wireless communication terminal 103 as indicated by the solid line in FIG. 4.

Second Embodiment

A second embodiment will be described below. The second embodiment differs from the first embodiment in that the wireless power transmission apparatus 101 includes an array antenna 201 configured by a plurality of element antennas in place of the receiving antenna 111 and the transmitting antenna 112. Elements similar to those of the first embodiment are not described in detail here but elements different from those of the first embodiment will be described in detail.

Figure 5:
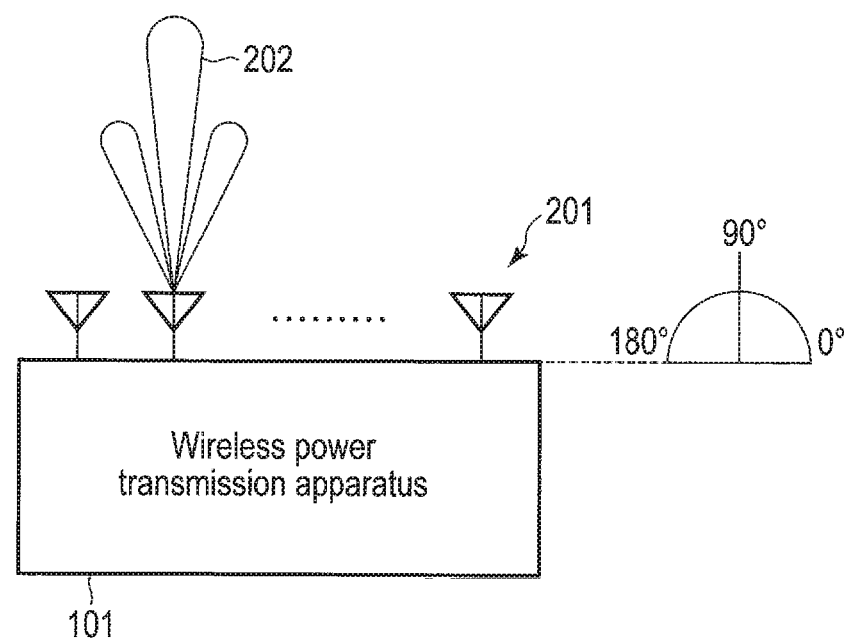
FIG. 5 shows characteristics of an array antenna according to a second embodiment.

The array antenna 201 is configured by a plurality of element antennas and controls the amplitudes and phases of excitation of the element antennas independently to allow the directivity to be controlled adaptively. Specifically, the array antenna 201 may have a beam with sharp directivity toward a predetermined direction within a range of 0° to 180° with respect to the surface on which the array antenna 201 is placed, as shown in FIG. 5. FIG. 5 illustrates a case where the array antenna 201 forms a beam 202 with directivity toward the direction of 90°.

The array antenna 201 can receive a wireless signal with a high gain from a sharp-directivity direction (i.e., a direction to which the beam 202 is directed). That is, the array antenna 201 can receive a wireless signal from a direction to which the beam 202 is directed, with a higher receiving antenna gain $G_{r1}$, and thus the signal detection sensitivity α can be improved. High receiving antenna gain $G_{r1}$ and high signal detection sensitivity α make it possible to increase the value of the first term of the above expression (8). That is, the detection capability of the wireless power transmission apparatus 101 can be improved and accordingly the upper limit value of the transmission power $P_1$ can be increased. To allow the upper limit value of the transmission power $P_1$ to increase makes it possible to improve the power transmission efficiency because the power (energy) that can be supplied in a fixed time can be increased.

Note that the host processor 114 controls in which direction the array antenna 201 has a sharp directivity (namely, to which direction the beam 202 is directed). The host processor 114 controls the array antenna 201 to have a sharp directivity in the direction where the wireless communication terminal 103 is located if the location of the wireless communication terminal 103 is grasped in advance.

Figure 6:
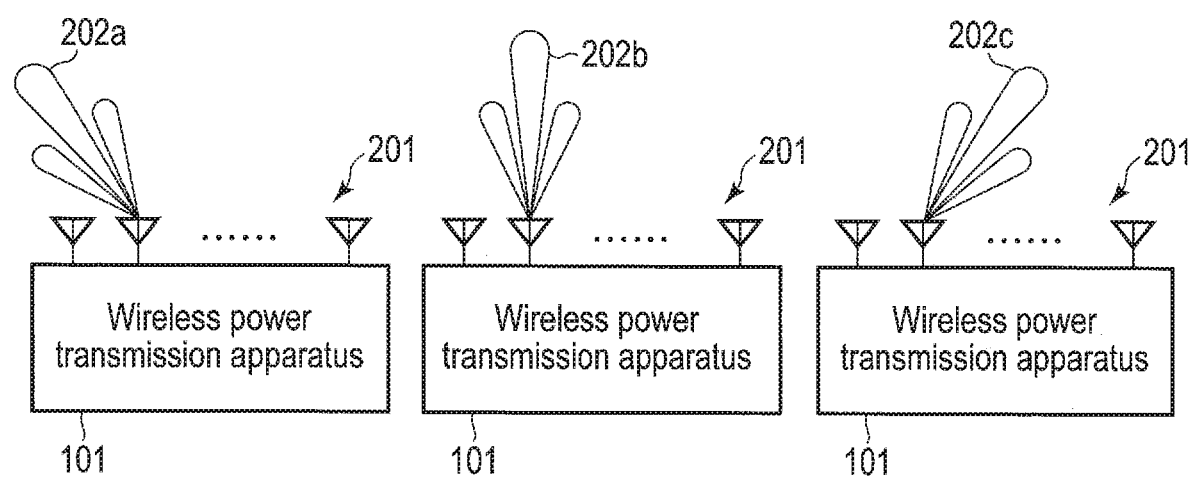
FIG. 6 shows characteristics of the array antenna according to the second embodiment.

If the location of the wireless communication terminal 103 is not grasped, the host processor 114 may control the array antenna 201 to have directivity that varies from time division to time division, as shown in FIG. 6, for example. FIG. 6 illustrates an example where beams 202a to 202c are directed in order toward first to third directions to control the array antenna 201 to have directivity in order in the first to third directions.

Furthermore, when the location of the wireless communication terminal 103 cannot be grasped, the host processor 114 estimates the location of the wireless communication terminal 103 (i.e., the host processor 104 estimates the arrival direction of a wireless signal from the wireless communication terminal 103) to control the array antenna 201 to have directivity in the estimated direction.

A method of estimating the arrival direction of a wireless signal will be described with reference to FIG. 7. Assume here that the distance between two element antennas constituting the array antenna 201 is d and the wireless signal arrives from azimuth θ. In this case, the following equation (9) is satisfied:

$$d \cdot \cos(\theta) = c \cdot \Delta T \quad (9)$$

where c is the speed of light and $\Delta T$ shows a reception time difference between the element antennas.

When the phase difference in received signal between the element antennas is $\Delta \Psi$, the following equation (10) is satisfied:

$$\Delta \Psi = 2\pi \cdot f \cdot \Delta T \quad (10)$$

where f is the frequency of an arriving wireless signal. According to the equations (9) and (10), azimuth θ is computed as represented by the following equation (11):

$$\theta = \cos^{-1}\{(c \cdot \Delta T)/d\} \quad (11)$$
$$\cos^{-1}\{(f \cdot \lambda \cdot \Delta T)/d\}$$
$$\cos^{-1}\{(\lambda \cdot \Delta \Psi)/2\pi d\}$$

wherein λ is the wavelength of the arriving wireless signal.

The host processor 114 may estimate the arrival direction of the wireless signal through the process based upon the above equation (11) to control the array antenna 201 so as to have directivity in the estimated direction.

It has been so far described that the directivity of the receiving antenna is controlled to improve the receiving antenna gain $G_{r1}$ and signal detection sensitivity α and thus improve the power transmission efficiency. However, the directivity of the transmitting antenna is controlled to improve the transmitting antenna gain $G_{t1}$ and thus improve the power transmission efficiency to the power receiver 102.

Furthermore, the directivity of the transmitting antenna can be controlled to control the radiation direction of electromagnetic waves (power feeding beams) radiated from the wireless power transmission apparatus 101 to the power receiver 102 and thus reduce the risk of causing the power transmission beams to interfere with the wireless communication terminal 103. For example, the host processor 114 can estimate the arrival direction of the wireless signal through the process based on the above equation (11) to control the array antenna 201 such that the power transmission beams are not directed in the estimated direction and thus reduce the risk of causing the power transmission beams to interfere with the wireless communication terminal 103.

According to the foregoing second embodiment, since the wireless power transmission apparatus 101 includes the array antenna 201, the power transmission efficiency to the power receiver 102 can be improved more than that in the first embodiment described above.

In the second embodiment, it is assumed that the wireless power transmission apparatus 101 includes the array antenna 201 that functions as a transmitting/receiving antenna. However, the wireless power transmission apparatus 101 may include a receiving array antenna and a transmitting array antenna separately. Alternatively, some of the element antennas constituting the array antenna 201 are allowed to function as transmitting array antennas and the other element antennas are allowed to function as receiving array antennas. Alternatively, the array antenna 201 can be used time-divisionally by the host processor 114 to selectively function as a receiving array antenna when it receives a wireless signal and function as a transmitting array antenna when it transmits a power feeding signal.

Figure 7:
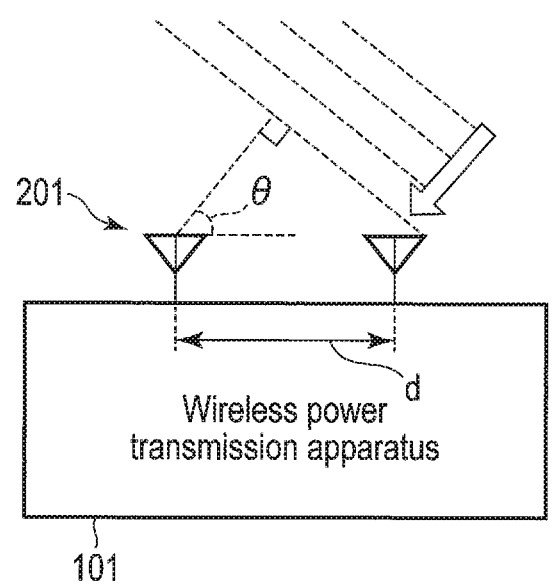
FIG. 7 is a diagram illustrating a method of estimating an arrival direction of a wireless signal according to the second embodiment.

The array antenna 201 can be used to estimate the azimuth θ as shown in FIG. 7. The array antenna 201 can also be used to estimate the elevation φ (not shown). The array antenna 201 can also be constituted as two-dimensional array to estimate both the azimuth θ and the elevation φ.

Third Embodiment

A third embodiment will be described. The third embodiment differs from the first and second embodiments in that the wireless power transmission apparatus 101 has an analysis function of analyzing the communication characteristics of the wireless communication terminal 103. Elements similar to those of the first and second embodiments are not described in detail here but elements different from those of the first and second embodiments will be described in detail.

Upon receipt of a wireless signal from the wireless communication terminal 103 via the receiving antenna ill, the receiver 113 decodes the received wireless signal. Specifically, the receiver 113 decodes the received wireless signal (wireless packet) and reads information (hereinafter referred to as "header information") out of the header of the wireless packet (MAC header, PHY header, etc.). The header information represents, for example, traffic, the number of terminals, received power, throughput, a frame type and the like. The read header information is transmitted to the host processor 114. In the third embodiment, the receiver 113 has only to at least decode a header portion of the wireless packet, but may decode the entire wireless packet.

Upon receipt of the header information from the receiver 113, the host processor 114 analyzes the communication characteristics of the wireless communication terminal 103 based on the header information. Based on the result of the analysis, the host processor 114 determines how much the wireless communication terminal 103 can currently accept interference from the wireless power transmission apparatus 101. When the host processor 114 determines that the acceptable level is low, it controls the wireless power transmitter 115 to execute the wireless power transmission with the transmission power $P_1$ that is smaller than the upper limit value computed based on the above expression (8). When the host processor 114 determines that the acceptable level is high, it controls the wireless power transmitter 115 to execute the wireless power transmission with the transmission power $P_1$ of the computed upper limit value (or the transmission power $P_1$ close to the upper limit value).

For example, the host processor 114 analyzes traffic (data amount) indicated by the header information. As a result of an analysis, when the traffic is large (when the traffic is a first threshold value or more), the host processor 114 may determine that the interference acceptable level is low and control the wireless power transmitter 115 to execute the wireless power transmission with a small amount of power. On the other hand, when the traffic is small (when the traffic is smaller than the first threshold value), the host processor 114 may determine that the interference acceptable level is high and control the wireless power transmitter 115 to execute the wireless power transmission with a large amount of power.

In terms of the analysis of traffic, the host processor 114 may analyze a traffic type. For example, when the type of a wireless communication system is a wireless LAN, the traffic type is classified into four QoS (quality of service) classes. Thus, the host processor 114 analyzes which of the four classes the traffic type is. When the traffic type is a high-priority class such as voice data, the host processor 14 may determine that the interference acceptable level is low and control the wireless power transmitter 115 to execute the wireless power transmission with a small amount of power. On the other hand, when the traffic type is a low-priority class such as text data, the host processor 14 may determine that the interference acceptable level is high to control the wireless power transmitter 115 to execute the wireless power transmission with a large amount of power.

Figure 8:
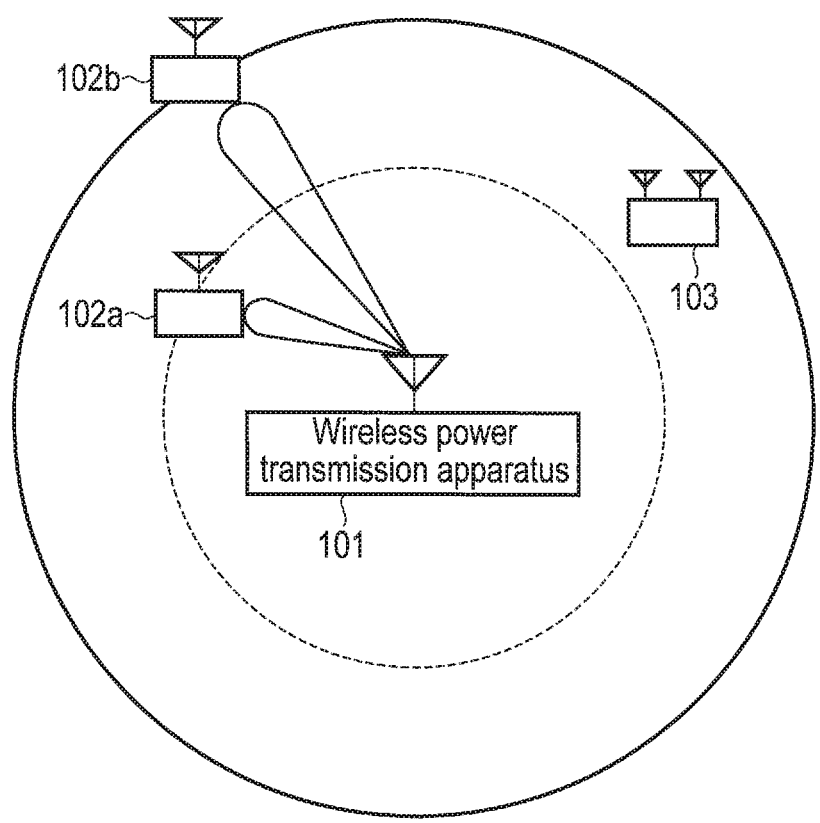
FIG. 8 shows an example of wireless power transmission environment according to a third embodiment.

For example, when communications are carried out using an IP phone between the wireless communication terminal 103 shown in FIG. 8 and another wireless communication terminal, the wireless power transmission apparatus 101 (the host processor 114 of the wireless power transmission apparatus 101) recognizes that the traffic type is a high-priority class as a result of the above analysis. The wireless power transmission apparatus 101 therefore determines that the interference acceptable level is low, and executes the wireless power transmission with a small amount of power such that the power can be supplied within the range indicated by the dotted line in FIG. 8 (i.e., the wireless power transmission apparatus 101 executes the wireless power transmission only to a nearby power receiver). Accordingly, the wireless power transmission apparatus 101 can supply power wirelessly without interfering with the wireless communication terminal 103, but power can be supplied wirelessly only to the power receiver 102a.

On the other hand, when communications are carried out via email between the wireless communication terminal 103 shown in FIG. 8 and another wireless communication terminal, the wireless power transmission apparatus 101 recognizes that the traffic type is a low-priority class as a result of the above analysis. The wireless power transmission apparatus 101 therefore determines that the interference acceptable level is high, and executes the wireless power transmission with a large amount of power wirelessly such that the power can be supplied within the range indicated by the solid line in FIG. 8 (i.e., the wireless power transmission apparatus 101 executes the wireless power transmission to a remote power receiver as well). Accordingly, the wireless power transmission apparatus 101 can supply power to both the power receivers 102a and 102b wirelessly though it slightly interferes with the wireless communication terminal 103.

It has been described above that the host processor 114 analyzes traffic. For example, the host processor 114 may analyze the number of terminals represented by the header information and, when the number of terminals is large (when the number of terminals is a second threshold value or more), may determine that a large number of terminals are likely to get interfered and the interference acceptable level is low to control the wireless power transmitter 115 so as to execute the wireless power transmission with a small amount of power. On the other hand, when the number of terminals is small (when the number of terminals is smaller than the second threshold value), the host processor 114 may determine that a small number of terminals are likely to get interfered and the interference acceptable level is high to control the wireless power transmitter 115 so as to execute the wireless power transmission with a large amount of power.

The host processor 114 may also statistically analyze the communication characteristics of the wireless communication terminal 103 based upon a plurality of items of header information obtained by decoding a plurality of wireless packets having a chronological context. Specifically, the host processor 114 may compare the histogram of reception power obtained before transmission power is increased (or before power is supplied wirelessly) and the histogram of reception power obtained after the transmission power is increased (or after power is supplied wirelessly) and, when a significant change appears between both the histograms, may determine that it interferes with the wireless communication terminal 103 and control the wireless power transmitter 115 so as to execute the wireless power transmission with a small amount of power. On the other hand, when no significant change appears between them, the host processor 114 may determine that it does not interfere with the wireless communication terminal 103 and control the wireless power transmitter 115 so as to execute the wireless power transmission with a large amount of power.

According to the third embodiment described above, the wireless power transmission apparatus 101 further has a function capable of analyzing the communication characteristics of the wireless communication terminal 103 and controlling transmission power $P_1$ based on the result of the analysis. Therefore, the power transmission efficiency to the power receiver 102 can be improved while minimizing the interference with the wireless communication system.

In the third embodiment, with reference to the upper limit value computed based on the above expression (8), the host processor 114 controls the wireless power transmitter 115 to execute the wireless power transmission with the transmission power $P_1$ that is smaller than the upper limit value when the interference acceptable level is low, and also controls it to execute the wireless power transmission with the transmission power $P_1$ (or transmission power $P_1$ close to the upper limit value) when the interference acceptable level is high. However, the host processor 114 may change the interference acceptable level $P_3$ of the wireless communication terminal 103 to a value that is higher than the defined value, and compute the upper limit value based upon the above expression (8) to control the wireless power transmitter 115 so as to execute the wireless power transmission with the transmission power $P_1$ based upon the upper limit value when the interference acceptable level is low. On the other hand, when the interference acceptable level is high, the host processor 114 computes the upper limit value based upon the above expression (8) with the interference acceptable level $P_3$ of the wireless communication terminal 103 indicated the defined value and controls the wireless power transmitter 115 so as to execute the wireless power transmission with the transmission power $P_1$ based upon the upper limit value.

Fourth Embodiment

Figure 9:
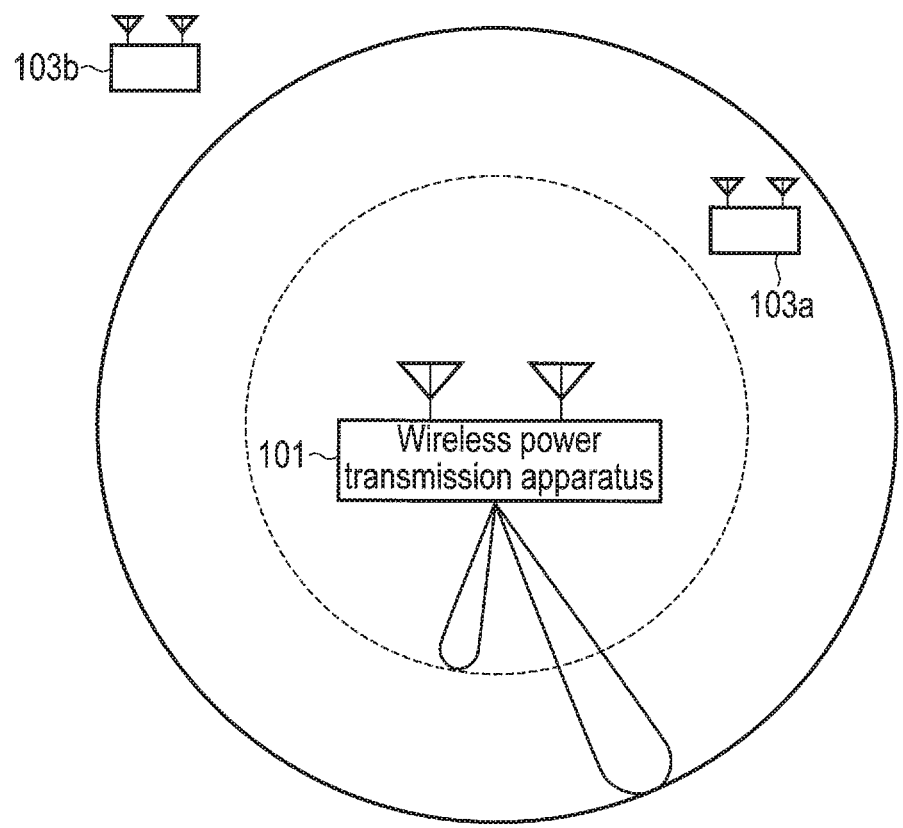
FIG. 9 shows an example of wireless power transmission environment according to a fourth embodiment.

A fourth embodiment will be described below. As shown in FIG. 9, the fourth embodiment differs from the first embodiment in that the wireless power transmission environment includes a plurality of wireless communication terminals 103a and 103b (a second electronic apparatus and a third electronic apparatus). In other words, the fourth embodiment differs from the first embodiment in that the wireless power transmission apparatus 101 executes the wireless power transmission in consideration of interference with both the wireless communication terminals 103a and 103b. Elements similar to those of the first embodiment are not described in detail here but elements different from those of the first embodiment will be described in detail.

FIG. 10 shows an example of a hardware configuration of the wireless power transmission apparatus 101 according to the fourth embodiment. As shown in FIG. 10, the wireless power transmission apparatus 101 includes receiving antennas 111A and 111B having their respective receiving antenna gains $G_{r1A}$ and $G_{r1B}$ and receivers 113A and 113B connected to their respective receiving antennas 111A and 111B. Note that the function of the receiving antennas 111A and 111B is similar to that of the receiving antenna 111 shown in FIG. 2 and the function of the receivers 113A and 113B is also similar to that of the receiver 113 shown in FIG. 2.

It is assumed here that the configuration of the receiving antenna 111A and receiver 113A corresponding to that of the wireless communication terminal 103a and the configuration of the receiving antenna 111B and receiver 113B corresponds to that of the wireless communication terminal 103b. That is, it is assumed in the fourth embodiment that the wireless power transmission apparatus 101 previously grasps, for example, the frequency band used in the wireless communication terminals 103a and 103b that are likely to get interfered.

Furthermore, in FIG. 10, the receivers 113A and 113B corresponding to the wireless communication terminals 103a and 103b are provided as different chips; however, the receivers 113A and 113B may be achieved as one chip.

The memory 113Ab of the receiver 113A stores information indicating signal detection sensitivity $\alpha_A$ representing the lower limit of the intensity of a wireless signal that can be detected by the receiver 113A. Similarly, the memory 113Bb of the receiver 113B stores information indicating signal detection sensitivity $\alpha_B$ representing the lower limit of the intensity of a wireless signal that can be detected by the receiver 113B.

Based on the above expression (8), the host processor 114 computes the upper limit value $U_A$ of transmission power $P_1$ corresponding to the detection capability of the receiver 113A and the upper limit value $U_B$ of transmission power $P_1$ corresponding to the detection capability of the receiver 113B.

The upper limit value $U_A$ of the transmission power $P_1$ is the upper limit value of transmission power capable of executing the wireless power transmission without interfering with the wireless communication terminal 103a, and the range indicated by the dotted line in FIG. 9 is a range capable of executing the wireless power transmission with the transmission power $P_1$ of the upper limit value $U_A$. On the other hand, the upper limit value $U_B$ of the transmission power $P_1$ is the upper limit value of transmission power capable of executing the wireless power transmission without interfering with the wireless communication terminal 103b, and the range indicated by the solid line in FIG. 9 is a range capable of executing the wireless power transmission with the transmission power $P_1$ of the upper limit value $U_B$.

The host processor 114 compares the computed upper limit values $U_A$ and $U_B$ and sets a smaller one of them as the upper limit value of the transmission power $P_1$ of the wireless power transmission apparatus 101. For example, in the wireless power transmission environment of FIG. 9, the upper limit value $U_A$ is smaller than the upper limit value $U_B$ and thus the upper limit value $U_A$ is set as the upper limit value of the transmission power $P_1$. That is, the range indicated by the dotted line in FIG. 9 is a range in which the wireless power transmission apparatus 101 can supply power.

According to the fourth embodiment described above, the wireless power transmission apparatus 101 further has a function capable of computing the upper limit values $U_A$ and $U_B$ of the transmission power $P_1$, which correspond to the wireless communication terminals 103a and 103b, respectively and controlling the transmission power $P_1$ based on a smaller one of the upper limit values. It is thus possible to execute the wireless power transmission with a large amount of power to the power receiver 102, without causing serious interference with the wireless communication terminals 103a and 103b.

The fourth embodiment is useful in the following situations. For example, when the wireless power transmission apparatus 101 executes the wireless power transmission in the 5 GHz band, it is necessary to consider interference with the wireless LAN and dedicated short range communication (DSRC) as a wireless communication system using the 5 GHz band. In this case, the wireless power transmission apparatus 101 includes the receiving antenna 111A and receiver 113A corresponding to the wireless LAN and the receiving antenna 111B and receiver 113B corresponding to the DSRC to allow the upper limit values $U_A$ and $U_B$ of transmission power $P_1$ corresponding to the two wireless communication systems. Accordingly, it is possible to execute the wireless power transmission with a large amount of power to a power supply target without causing serious interference with either the wireless LAN or the DSRC.

As examples of the frequency band that the wireless power transmission apparatus 101 uses to execute the wireless power transmission to the power receiver 102, there are the first half of 5.7 GHz band, which does not overlap the DSRC, one of the channels of the wireless LAN in the 5 GHz band, which is not used, and the like.

In the fourth embodiment, it is assumed that the number of wireless communication terminals included in the wireless power transmission environment is two; however, the number may be three or more. In this case, too, the same advantage as described above can be obtained if the receiving antenna 111 and the receiver 113 are provided to correspond to their respective wireless communication terminals.

Furthermore, in the fourth embodiment, the host processor 114 sets a smaller one of the two upper limit values $U_A$ and $U_B$ of transmission power $P_1$ as the upper limit value of the transmission power $P_1$; however, for example, the upper limit value of the transmission power $P_1$ can be set by the method in the third embodiment. More specifically, the host processor 114 compares traffic indicated by header information obtained by decoding a wireless packet from the wireless communication terminal 103a and traffic indicated by header information obtained by decoding a wireless packet from the wireless communication terminal 103b. As a result, when the host processor 114 determines that the traffic of the wireless communication terminal 103a is more dominant (in other words, the traffic of the wireless communication terminal 103a is greater than that of the wireless communication terminal 103b), it may set the upper limit value $U_A$ corresponding to the wireless communication terminal 103a as the upper limit value of the transmission power $P_1$. When the host processor 114 determines that the traffic of the wireless communication terminal 103b is more dominant, it may set the upper limit value $U_B$ corresponding to the wireless communication terminal 103b as the upper limit value of the transmission power $P_1$.

According to at least one of the first to fourth embodiments described above, power can be supplied wirelessly without causing serious interference with another wireless communication system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
   a power transmitter configured to transmit power to a first electronic apparatus by an electromagnetic wave;
   a receiver configured to receive a communication signal wirelessly from a second electronic apparatus; and
   control circuitry configured to control power transmitted by the power transmitter, based on at least a detection sensitivity of the receiver,
   wherein:
   the receiver is configured to receive the communication signal via a first antenna; and
   the control circuitry is configured to set the detection sensitivity of the receiver, based on a gain of the first antenna.

2. The electronic apparatus of claim 1, wherein:
   the first antenna comprises an array antenna; and
   the control circuitry is configured to:
      estimate a direction from which the communication signal arrives, and
      control the array antenna to have directivity in the direction.

3. The electronic apparatus of claim 2, wherein the control circuitry is configured to control the array antenna to have directivity that varies from time division to time division.

4. The electronic apparatus of claim 1, wherein the control circuitry is configured to control the power transmitted by the power transmitter, based on acceptance of interference with the second electronic apparatus from the electronic apparatus.

5. The electronic apparatus of claim 1, wherein the communication signal is a signal that conforms to one of a wireless LAN and DSRC.

6. An electronic apparatus comprising:
   a power transmitter configured to transmit power to a first electronic apparatus by an electromagnetic wave;
   a receiver configured to receive a communication signal wirelessly from a second electronic apparatus; and
   control circuitry configured to control power transmitted by the power transmitter, based on at least a detection sensitivity of the receiver,
   wherein the control circuitry is configured to:
      set communication characteristics of the second electronic apparatus based on the communication signal, and
      control the power transmitted by the power transmitter based on the communication characteristics.

7. An electronic apparatus comprising:
   a power transmitter configured to transmit power to a first electronic apparatus by an electromagnetic wave;
   a receiver configured to receive a communication signal wirelessly from a second electronic apparatus; and
   control circuitry configured to control power transmitted by the power transmitter, based on at least a detection sensitivity of the receiver,
   wherein:
   the receiver is further configured to receive a signal wirelessly from a third electronic apparatus; and
   the control circuitry is configured to control the power transmitted by the power transmitter, based on a detection sensitivity of the second electronic apparatus and a detection sensitivity of the third electronic apparatus.

8. The electronic apparatus of claim 7, wherein the control circuitry is configured to select a smaller one of a transmission power based on the detection sensitivity of the second electronic apparatus and a transmission power based on the detection sensitivity of the third electronic apparatus, as the power transmitted by the power transmitter.

9. A method comprising:
   transmitting power to a first electronic apparatus by an electromagnetic wave;
   receiving, by communication circuitry, a communication signal wirelessly from a second electronic apparatus; and
   controlling the power based on at least a detection sensitivity of the communication circuitry,
   wherein the receiving comprises receiving the communication signal via a first antenna; and
   wherein the controlling comprises setting the detection sensitivity of the communication circuitry, based on a gain of the first antenna.

10. The method of claim 9, wherein:
    the first antenna comprises an array antenna, and
    the method further comprises estimating a direction from which the communication signal arrives and controlling the array antenna to have directivity in the estimated direction.

11. The method of claim 10, further comprising controlling the array antenna to have directivity that varies from time division to time division.

12. The method of claim 9, further comprising controlling the power transmitted by the power transmitter, based on acceptance of interference with the second electronic apparatus from the power transmitter.

13. The method of claim 9, wherein the communication signal is a signal that conforms to one of a wireless LAN and DSRC.

14. A method comprising:
    transmitting power to a first electronic apparatus by an electromagnetic wave;
    receiving, by communication circuitry, a communication signal wirelessly from a second electronic apparatus;
    controlling the power based on at least a detection sensitivity of the communication circuitry;
    setting communication characteristics of the second electronic apparatus based on the communication signal; and
    controlling the power transmitted by the power transmitter based on the communication characteristics.

15. A method comprising:
    transmitting power to a first electronic apparatus by an electromagnetic wave;
    receiving, by communication circuitry, a communication signal wirelessly from a second electronic apparatus;
    controlling the power based on at least a detection sensitivity of the communication circuitry;
    receiving, by the communication circuitry, a signal wirelessly from a third electronic apparatus; and controlling the power transmitted by the power transmitter, based on a detection sensitivity of the second electronic apparatus and a detection sensitivity of the third electronic apparatus.

16. The method of claim 15, further comprising selecting a smaller one of a transmission power based on the detection sensitivity of the second electronic apparatus and a transmission power based on the detection sensitivity of the third electronic apparatus, as the power transmitted by the power transmitter.

* * * * *